United States Patent [19]
Brilando et al.

[11] 3,961,811
[45] June 8, 1976

[54] BICYCLE REFLECTOR BRACKET

[75] Inventors: Frank P. Brilando, Niles; Rudolph G. Blaho, Franklin Park, both of Ill.

[73] Assignee: Schwinn Bicycle Company, Chicago, Ill.

[22] Filed: Feb. 24, 1975

[21] Appl. No.: 552,350

[52] U.S. Cl. .............................. 280/289 A; 224/39; 248/214; 248/221 A; 248/221 C; 188/24; 116/28 R; 350/307; 350/97
[51] Int. Cl.² .......................................... B62J 5/20
[58] Field of Search ................. 280/289; 116/28 R; 188/24; 350/97, 99, 307; 248/214, 215, 216, 217, 221 A, 221 C; 224/39, 41

[56] References Cited
UNITED STATES PATENTS

| | | | |
|---|---|---|---|
| 582,070 | 5/1897 | Lester | 280/289 |
| 1,056,911 | 3/1913 | Kinzey | 248/215 |
| 2,096,380 | 10/1937 | Reicks | 248/221 A |
| 2,628,373 | 2/1953 | Mahan | 248/214 X |
| 2,701,540 | 2/1955 | Hamilton | 350/99 X |

FOREIGN PATENTS OR APPLICATIONS

| | | | |
|---|---|---|---|
| 55,992 | 10/1937 | Denmark | 224/39 R |
| 215,270 | 6/1941 | Switzerland | 280/289 |
| 713,704 | 8/1954 | United Kingdom | 224/392 |
| 277,520 | 9/1927 | United Kingdom | 248/475 R |

*Primary Examiner*—M. H. Wood, Jr.
*Assistant Examiner*—John P. Silverstrim
*Attorney, Agent, or Firm*—McCaleb, Lucas & Brugman

[57] ABSTRACT

A simple, inexpensive and easily installed bracket securely mounts a bicycle light reflector to the frame of a bicycle. The bracket, particularly suitable for use with a bicycle having caliper brakes, comprises: a slotted mounting portion adapted to be inserted between a cross member for joining bicycle frame portions and a brake arm bridge of a caliper brake mounted to the cross member by means of a center bolt, an upper forked end portion formed integrally with the mounting portion and substantially normal thereto in a forward direction and adapted to overlie the cross member, a lower arcuate cross-section portion formed integrally with the mounting portion and substantially normal thereto and being adapted to extend rearwardly beneath the caliper brake bridge, and an end portion integrally formed with the lower portion remote from the forked end portion and having means for mounting the reflector in substantially vertical position.

5 Claims, 1 Drawing Figure

BICYCLE REFLECTOR BRACKET

BACKGROUND OF THE INVENTION

1. Field of the Invention

The present invention relates in general to bicycle safety equipment such as light reflectors, and, more particularly, to a novel bracket for mounting a light reflector to the frame of a bicycle.

2. Description of the Prior Art

Bicycle light reflectors typified by those disclosed in U.S. Pat. No. D 237,155, have been provided as desirable bicycle safety equipment.

However, need has arisen for a simple and inexpensive bracket for mounting such light reflectors, particularly on bicycles having caliper brakes.

SUMMARY OF THE INVENTION

The principal object of the present invention is to provide a bicycle reflector bracket which is simple in design and inexpensive to manufacture, and which provides secure vertical reflector mounting for optimum reflector visibility.

Another important object of the present invention is to provide an easily installed bicycle reflector bracket, particularly suitable for mounting a light reflector to a bicycle having caliper brakes, by utilizing the existing brake mounting hardware to mount the reflector, but without interference with the movement of the caliper brake arms and cables.

In order to attain these objects, the bicycle reflector bracket of the present invention preferably comprises: a slotted mounting portion attachable to a cross member for joining bicycle frame portions by means of a bolt, an upper forked end portion formed integrally with the mounting portion and substantially normal thereto in a forward direction and adapted to overlie the cross member, a lower intermediate arcuate cross-section portion formed integrally with the mounting portion and substantially normal thereto and being adapted to extend rearwardly, and an end portion integrally formed with the lower portion remote from the forked end portion and having means for mounting the reflector in substantially vertical position for optimum visibility.

DESCRIPTION OF THE PREFERRED EMBODIMENT

Figure 1:
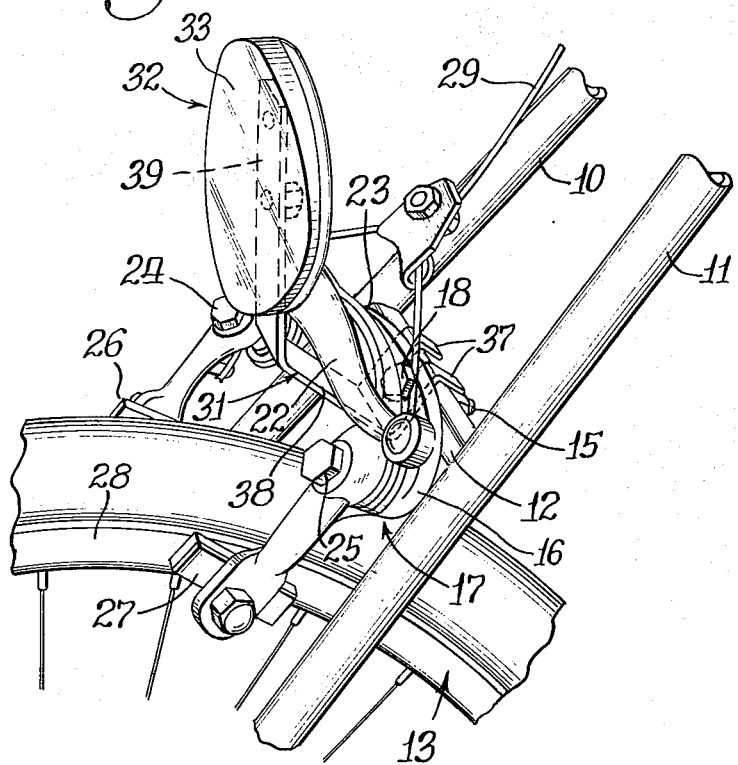
FIG. 1 is a perspective view illustrating the basic features of the preferred embodiment of the bicycle reflector bracket of the present invention, shown mounted to the rear frame of a bicycle having caliper brakes.
Figure 2:
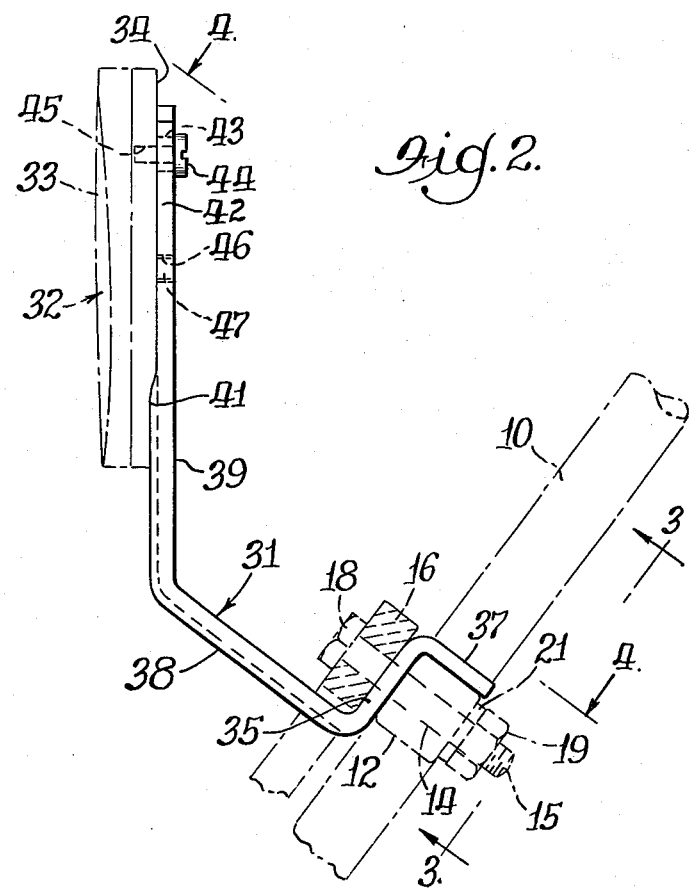
FIG. 2 is a side elevational view, with parts broken away and parts in section, of the bicycle reflector bracket illustrated in FIG. 1.

With reference to FIG. 1, a bicycle having caliper brakes comprises downwardly and rearwardly extending parallel rear frame portions 10, 11 joined by a horizontal cross member 12 above a rear wheel 13 in a known manner. As best seen in FIG. 2, the horizontal cross member 12, being substantially square in cross section, comprises a hole or aperture 14 therein for receiving a bolt shown as a center bolt 15 (FIGS 1 and 2) for mounting a brake arm bridge 16 of a known bicycle caliper brake generally illustrated by reference numeral 17 in FIG. 1. Bolt 15 has a head 18 (FIG. 2), and is operable to securely fasten the brake arm bridge 16 to the cross member 12 upon tightening a lock nut 19 against a washer 21. As shown in FIG. 1, the caliper brake 17 comprises arms 22, 23 which are pivotally mounted to the brake arm bridge 16 by means of bolts 24, 25 in a known manner to actuate brake shoes 26, 27, respectively, for frictional braking engagement with a rim 28 of wheel 13 in response to a braking force manually applied to a cable 29.

Figure 3:
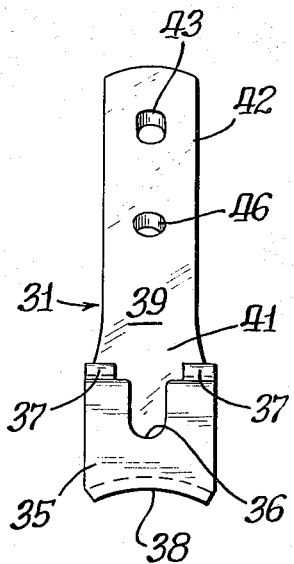
FIG. 3 is a view taken substantially along the lines 3—3 of FIG. 2 and looking in the direction of the arrows thereon, with the reflector and the bicycle frame portions broken away.
Figure 4:
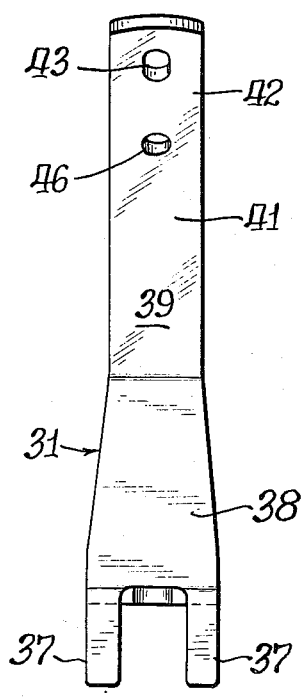
FIG. 4 is a view taken substantially along the lines 4—4 of FIG. 2 and looking in the direction of the arrows thereon, with the reflector and the bicycle frame portions broken away.

The preferred embodiment of the present invention comprises an elongated bracket generally illustrated by reference numeral 31 and preferably constructed of metal for mounting a known bicycle light reflector 32 (FIGS. 1 and 2) having a rear reflecting surface 33 and a front mounting surface 34. The reflector bracket 31 comprises a mounting portion 35 attachable to the cross member 12, preferably insertable and held between the brake arm bridge 16 and the cross member 12 illustrated in FIG. 2, the mounting portion having a slot or recess 36 (FIG. 3) for receiving the center bolt 15. Bracket 31 further comprises an end portion 37, preferably forked, and formed integrally with the mounting portion 35 and substantially normal thereto to extend forwardly and downwardly, as shown in FIG. 2. End portion 37 is operable, as best seen in FIGS. 1 and 2, to overlie cross member 12 in order to provide vertical support to the reflector 32. A lower intermediate arcuate cross-section portion 38 is formed integrally with the mounting portion 35 and substantially normal thereto, as best seen in FIG. 2, to extend rearwardly and upwardly, beneath the bridge 16 and the arms 22, 23 of the caliper brake 17, thereby avoiding interference with the operational movement of the arms or the cable 29. The bracket 31 further includes a substantially vertical upwardly projecting portion 39 formed as an integral extension of the lower portion 38, the angle therebetween being determined by the angular relationship between frame portions 10, 11 to the horizontal. The upwardly projecting portion 39 comprises an inner arcuate cross-section portion 41 and an integral outer flat strap portion 42, the latter having means for mounting the reflector 32. The reflector mounting means preferably comprises an outer hole 43 (FIG. 2) for receiving a reflector mounting screw 44 threadedly engaging a hole 45 located substantially in the center of the reflector, and an inner or lower hole 46 for engaging a locating pin 47 integrally formed with the rear surface 34 of the reflector 32.

The reflector 32 is easily bolted to the cross member 12 of the bicycle. For use with the illustrated bicycle having caliper brakes, the reflector 32 is easily mounted by first loosening the lock nut 19, simply inserting the mounting portion 35 between the brake arm bridge 16 and the cross member 12, and then re-tightening the lock nut on the center bolt 15. The arcuate shape of the lower rearwardly extending portion 38 and the inner arcuate portion 41 of the upwardly projecting portion 39 achieves sturdy and stable mounting of the reflector 32 and prevents distortion of the angular relationship of the portions of the bracket 31, with the result that the reflector 32 is maintained in vertical position for optimum reflector visibility.

It is thought that the invention and many of its attendant advantages will be understood from the foregoing description, and it is apparent that various changs may be made in the form, construction and arrangement of the component parts without departing from the spirit and scope of the invention or sacrificing all of its material advantages, the form described being merely a preferred embodiment thereof.

The embodiments of the invention in which an exclusive property or privilege is claimed are defined as follows:

1. A reflector mounting bracket for use on a bicycle having a cross member, a caliper brake arm bridge and a center bolt for attaching said bridge to said cross member, said bracket comprising a slotted mounting portion adapted to be inserted between said bridge and said cross member and to receive said center bolt therethrough, a forked end portion formed integrally with said mounting portion and extending substantially normal thereto in a first direction, an intermediate portion formed integrally with said mounting portion and extending substantially normal thereto in a second direction parallel and opposite to said first direction, a second end portion integrally formed with said intermediate portion and extending therefrom, and means for mounting said reflector on said second end portion, said reflector being disposed on said second end portion such that said forked end portion is adapted to overlie said cross member and said intermediate portion extends beneath said bridge.

2. The reflector bracket of claim 1, wherein said mounting portion and said second end portion are angularly disposed relative to one another to support the reflector in upright position, and said means for mounting the reflector comprises a hole for receiving a reflector mounting screw and a second hole for engaging a locating pin integrally formed with the reflector.

3. The reflector bracket of claim 1, wherein said second end portion comprises two parts consisting of an inner arcuate cross-section portion and an outer flat strap portion, the latter containing said means for mounting the reflector.

4. A rear reflector mounting bracket for use on a bicycle having a cross member, a caliper brake arm bridge and a center bolt for attaching said bridge to said cross member, said bracket comprising a slotted mounting portion adapted to be inserted between said bridge and said cross member and to receive said center bolt therethrough, a forked end portion formed integrally with said mounting portion and extending substantially normal thereto in a first forward direction, an intermediate portion formed integrally with said mounting portion and extending substantially normal thereto in a second direction parallel and opposite to said first direction, a second end portion integrally formed with said intermediate portion and extending vertically therefrom, means for mounting said reflector on said second end portion, said reflector bracket being disposed such that said forked end portion is adapted to overlie said cross member and said intermediate portion extends rearwardly beneath said bridge.

5. A reflector mounting bracket for use on a bicycle having frame portions joined by a cross member for receiving a bolt, said bracket comprising a slotted mounting portion attachable to said cross member and adapted to receive said bolt therethrough, a forked end portion formed integrally with said mounting portion and extending substantially normal thereto in a first direction, an intermediate portion formed integrally with said mounting portion and extending substantially normal thereto in a second direction parallel and opposite to said first direction, a second end portion integrally formed with said intermediate portion and extending therefrom, and means for mounting said reflector on said second end portion, said reflector bracket being disposed such that said forked end portion is adapted to overlie said cross member.

* * * * *